US006033751A

United States Patent [19]

Kline

[11] Patent Number: 6,033,751

[45] Date of Patent: Mar. 7, 2000

[54] SPLICED LINERLESS LABEL WEB

[75] Inventor: James R. Kline, Dayton, Ohio

[73] Assignee: Monarch Marking Systems, Inc., Dayton, Ohio

[21] Appl. No.: 08/984,290

[22] Filed: Dec. 3, 1997

[51] Int. Cl.[7] .......... B32B 3/10

[52] U.S. Cl. .......... 428/58; 428/57; 428/61; 428/43

[58] Field of Search .......... 428/58, 57, 61, 428/43, 906; 156/157

[56] References Cited

U.S. PATENT DOCUMENTS

| | | | |
|---|---|---|---|
| 3,733,240 | 5/1973 | Hanke | 161/102 |
| 4,417,940 | 11/1983 | Koster | 156/351 |
| 4,696,843 | 9/1987 | Schmidt | 428/41 |
| 5,057,347 | 10/1991 | Alvin | 428/43 |
| 5,128,188 | 7/1992 | Olson | 428/43 |
| 5,135,789 | 8/1992 | Schmidt | 428/42 |
| 5,472,755 | 12/1995 | Nibling, Jr. | 428/40 |
| 5,700,535 | 12/1997 | Galsterer et al. | 428/40.1 |
| 5,702,789 | 12/1997 | Fernandez-Kirchberger et al. | 428/40.1 |

*Primary Examiner*—Ellis Robinson
*Assistant Examiner*—Laura L. Lee
*Attorney, Agent, or Firm*—Joseph J. Grass

[57] ABSTRACT

There is disclosed a spliced web of linerless labels in roll form and a method of making same. The Webs have lines of partial severing along their lengths and the splice is made between two adjacent webs by a frangible tape which enables the labels at the splice to be separated by tearing, and wherein the remainder of the labels are separable by tearing along the transverse lines of partial severing.

11 Claims, 2 Drawing Sheets

SPLICED LINERLESS LABEL WEB

BACKGROUND OF THE INVENTION

1. Field of the Invention

This invention relates to the field of linerless label webs and to methods of making same.

2. Brief Description of the Prior Art

In the labeling field it is customary to market label rolls having a predetermined number of labels in each roll. It sometimes happens that the web breaks during the manufacturing process. Web breakage is encountered particularly in the event an adhesive-backed linerless label web has transverse lines of severing which divide the web into a series of linerless labels. When the web breaks during the manufacturing process, that roll has fewer than the predetermined number of labels. In order to fill the customer's order, each such partial roll has to be supplemented with another partial roll. Together these partial rolls would contain the same number of labels as would be found in one full roll. The use of partial rolls necessitates more frequent threading of the printer, wasting time and labels.

SUMMARY OF THE INVENTION

This invention relates to an improved label web having a coating of pressure sensitive adhesive on one side and in particular to a spliced web of linerless labels, and to methods of making same.

In accordance with of the invention, let it be assumed that a web of linerless labels with a coating of adhesive on one side is being wound into a roll and that a break in the web occurs at a transverse line of partial severing. The press and/or slitter operator lays a tape to be used for splicing in a guide on a non-stick surface. The marginal end of the web is laid over the tape. Next, the operator places a free end portion of the web with its adhesive side down in the guide and its marginal end portion is laid over the tape. A free end portion of another web is placed in the guide with its adhesive side down and its marginal end portion is laid over the tape. The marginal end portions of the webs are pressed against the tape to splice the webs together. It is preferred that the tape have adhesive on its underside so that the spliced web presents a continuous adhesive surface. Even the labels at the splice will fully adhere to merchandise or other surfaces. It is most preferred that also the top side of the tape have a coating of adhesive to enhance the adhesive bonding between the adhesive on the underside of the linerless web and the adhesive on the top surface of the tape. It is also preferred that the adhesive on the underside of the tape be of the same type as the adhesive on the underside of the linerless webs. For instance, if the adhesive on the linerless webs is a permanent type of adhesive, that is, an adhesive which will exhibit aggressive bonding to the substrate to which it is to be adhered, then the adhesive on the underside of the tape should also be of the permanent type. If, however, the adhesive on the linerless webs is a removable type of adhesive, that is, an adhesive which will be removable from the substrate to which it is to be adhered, then the adhesive on the underside of the tape should also be of the removable type. Therefore, all the labels in the web will have the same or similar caliber of adhesion, even those labels at the splice. Nevertheless, the adhesive on the top side of the tape can and most preferably should be a permanent type adhesive.

In the event the invention is used with label webs that have transverse lines of weakening e.g., lines of perforations, heavy creasing or the like, it is desired that the tape be of the frangible type so that the labels next adjacent the junction of the webs can be torn apart easily as is the case with the other labels in the spliced web.

DETAILED DESCRIPTION OF THE PREFERRED EMBODIMENTS

Figure 1:
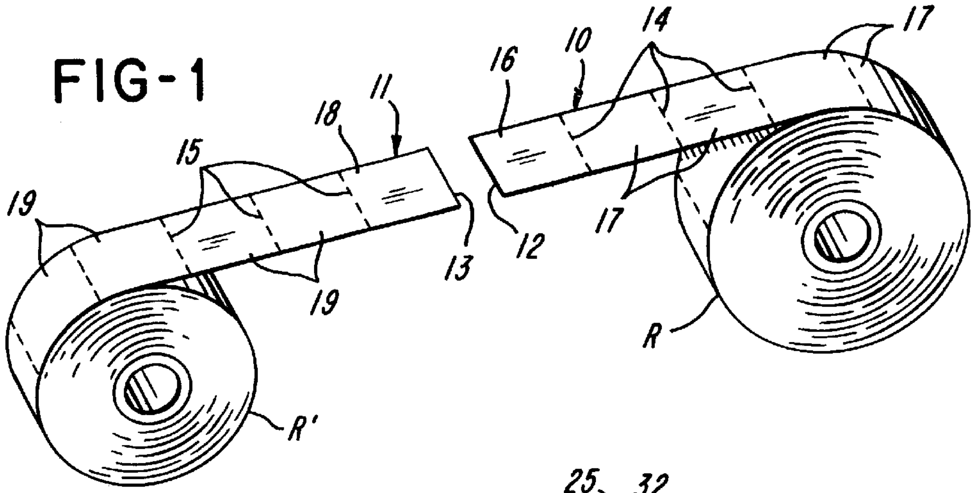
FIG. 1 is a perspective view of a pair of linerless label webs that are to be spliced to provide a spliced web.

Referring to FIG. 1, there are shown label webs generally indicated at 10 and 11. The webs 10 and 11 are shown to be spaced apart at their terminal ends 12 and 13. The webs 10 and 11 have longitudinally spaced transversely or laterally extending lines of partial severing 14 and 15, preferably perforations. The distance between each adjacent pair of lines of partial severing 14 and 15 is equal. The lines of partial severing divide the label web 10 into labels 16 and 17 and the lines of partial severing divide the label web 11 into labels 18 and 19. All the labels 16, 17, 18 and 19 are of equal length. The undersides of webs 10 and 11 are preferably provided with equally spaced registration marks 20 used by the printer for printing on the labels 16 and 19, and there is one registration mark per label 16, 17, 18 and 19.

Figure 3:
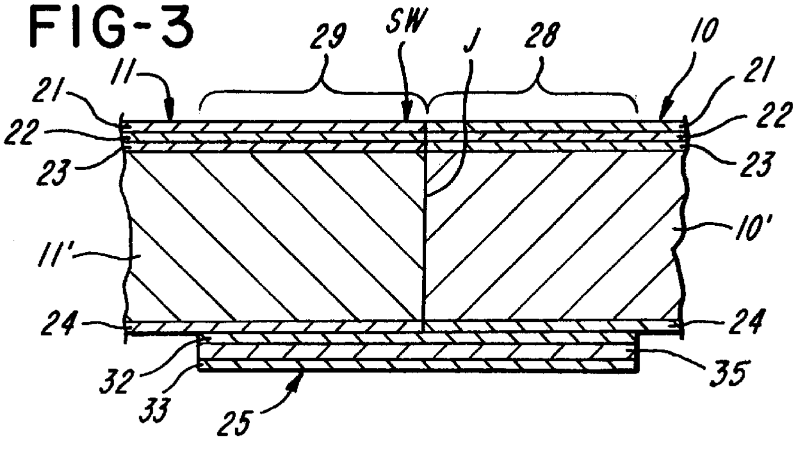
FIG. 3 is a sectional view of the label web and the tape taken along lines 3—3 of FIG. 2.

As best shown in FIG. 3, the labels 10 and 11 include a web of paper or other suitable material 10' and 11'. A thermal coating 23 is preferably applied to the material 10' and 11', an optional barrier coating 22 is preferably applied over the thermal coating 23, and a release coating 21 such as silicone is applied over the barrier coating 22. In the case of thermal transfer printing using an ink ribbon, the thermal and barrier coatings can be eliminated. The release coating 21 enables the web to be wound into a roll and subsequently unwound from the roll. A coating of adhesive 24 is applied to the underside of the webs 10' and 11'.

Figure 2:
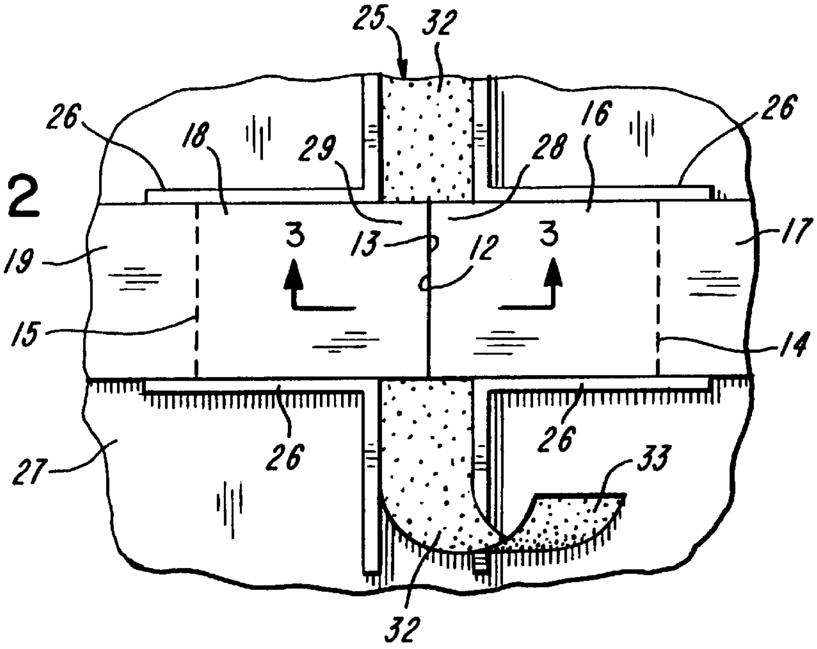
FIG. 2 is a top plan view of the label webs being spliced using a tape.
Figure 5:
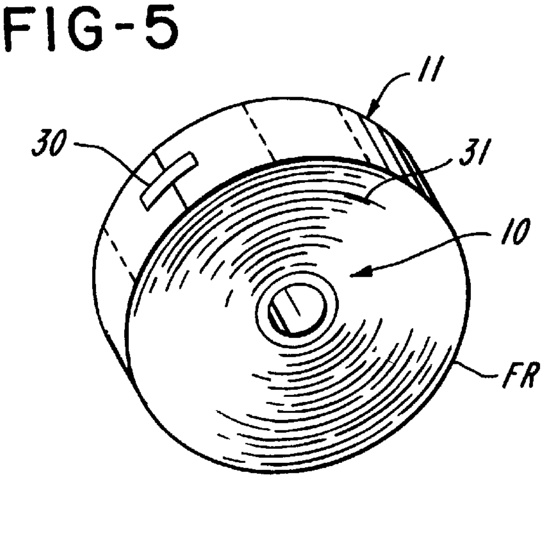
FIG. 5 is a perspective view of a spliced label web wound into a roll.
Figure 6:
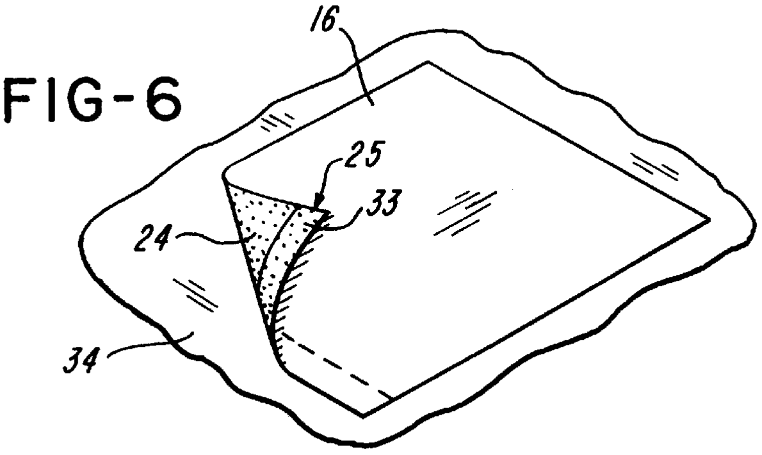
FIG. 6 is a perspective view of a label of the spliced web applied to a substrate.
Figure 4:
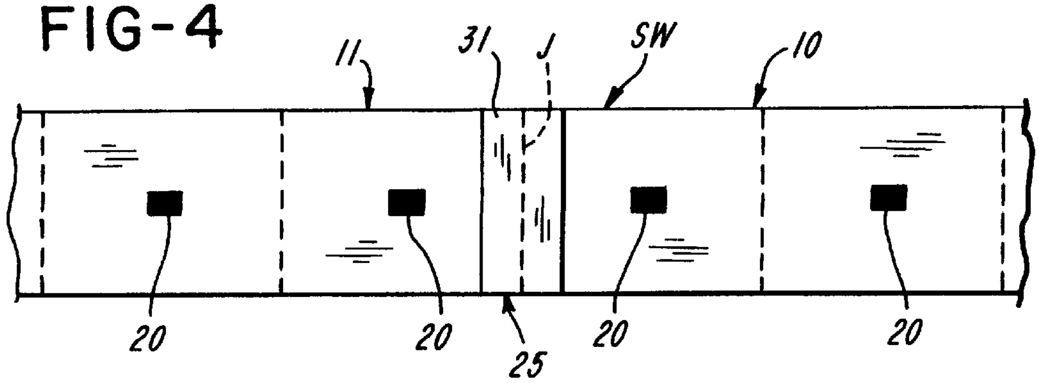
FIG. 4 is a bottom plan view of the spliced label web.

Consider that the web 10 is being wound into a roll, and a break occurs at a line of partial severing 14, thereby forming the terminal end 12. Therefore, roll R is only a partial roll and more labels are required in order to make it a full roll. As seen in FIG. 2, a strip of tape or material 25 is positioned laterally in a cross-shaped guide 26 arranged on a surface 27. The surface 27 is a non-stick surface which can be provided by a plasma or a silicone coating, or the like. Next, an end portion of the label web 10 having a convenient number of labels 16 and 17 is positioned longitudinally in the guide 26 on the surface 27. The terminal end 12 of the web 10 is positioned so that it falls along the center of the tape 25 and so that a marginal edge or end portion 28 overlies one-half of the width of the tape 25. Next, the label web 11 is positioned in the guide 26 in alignment with the web 10 until the terminal end 13 is preferably adjacent and most preferably touches or abuts the terminal end 12. The terminal ends 12 and 13 preferably touch so that the registration of the spliced web SW in the printer (not shown) is maintained. It is apparent that a marginal edge or end portion 29 overlies one-half of the width of the tape 25. Pressure is applied to bond the tape to the marginal end portions, thereby splicing the label webs 10 and 11 to each other. By trimming the excess tape 25 which extends beyond the side edges of the spliced webs 10 and 11, the winding of the roll R to completion can now be continued. Enough of the web 11 is now drawn off roll R' to bring the count of the labels on the roll R to the predetermined number. Thereupon, the web 11 can be severed and a piece of tape 30 can be applied across the free end of the spliced web generally indicated at SW. The tape 25 which has been adhered to the marginal end portions 28 and 29 across the terminal ends 12 and 13 can be referred to a splice 31. Although the splice 31 can be thin so as not to be noticeable except by close inspection, it is indicated at 31 in FIG. 5. The splice 31 is considered to span the junction J between the label webs 10 and 11.

If desired, instead of arranging the webs 10 and 11 and the tape 25 as shown in FIG. 2, the webs 10 and 11 can be placed adhesive-side up on a vacuum table and the tape 25 can be applied on top of the marginal end portions 28 and 29.

It is most preferred that the tape 25 be a double-coated tape so that a first side or top side of the tape 25 has a coating of adhesive 32 and a second side or the underside of the tape has a coating of adhesive 33. The coating 32 helps to make a better and quicker bond to the adhesive 24 than would be the case if the top surface of the tape 25 were free of adhesive. While some of the adhesive 24 on the webs 10 and 11 is masked by the tape 25, the adhesive 33 assures that the labels 16 and 18 will adhere fully to the substrate 34 to which they are adhered.

In the event the label webs 10 and 11 have lines of partial severing 14 and 15, it is preferred that the tape be frangible so that the tape 25 can be manually torn along the junction J to separate labels 16 and 18, in much the same manner as the labels 17 and 19 can be manually torn along respective tear lines 14 and 15.

The adhesives 24 and 33 are preferably of the same type, for example, either of the permanent type or of the removable type. The adhesive 32 is preferably an aggressive adhesive such as a permanent type of adhesive.

Although the full roll FR is shown to have one splice 31, it can have two or more splices.

If the linerless webs 10 and 11 are to be used with thermal transfer printing, the silicone coating 21 can be applied directly to the material 10' and 11' and the thermal coating 23 and the barrier coating 22 can be omitted.

When a linerless web with lines of partial severing is used, the tape 25 is preferably frangible and is made of material 35 which enables it to tear readily lengthwise of the tape at the junction J, but is it sufficiently strong to hold webs 10 and 11 together while being fed through and while being printed upon by a suitable printer such as a thermal printer, an ink jet printer or any other suitable type. A typical tape is a 928 double-coated high tack/low tack tissue tape sold by the 3M Company, Minneapolis, Minn. U.S.A.

Other embodiments and modifications of the invention will suggest themselves to those skilled in the art, and all such of these as come within the spirit of this invention are included within its scope as best defined by the appended claims.

I claim:

1. A spliced web of linerless label material, comprising: two longitudinally extending webs of linerless label material having marginal end portions terminating at terminal ends, the webs having longitudinally spaced transversely extending lines of partial severing to enable separation of adjacent labels by tearing, the webs being aligned and their terminal ends being in adjacent relationship to provide a junction, each web having a printable top side and an underside, the undersides of the webs having a coating of pressure sensitive adhesive, a strip of tape having first and second sides, the tape being applied with its first side against the adhesive on the marginal edges of the webs to provide a spliced web, the second side of the tape having a coating of adhesive, and the tape being frangible to enable the labels adjacent the junction to be torn apart at the junction.

2. A spliced web as defined in claim 1, wherein the first side of the tape has a coating of adhesive.

3. A spliced web as defined in claim 1, wherein both the adhesive on the undersides of the webs and the adhesive on the second side of the tape are either permanent or removable.

4. A spliced web as defined in claim 1, wherein both the adhesive on the undersides of the webs and the adhesive on the second side of the tape are permanent.

5. A spliced web as defined in claim 1, wherein both the adhesive on the underside of the webs and the adhesive on the second side of the tape are removable.

6. A spliced web as defined in claim 1, wherein the first side of the tape has a coating of permanent adhesive.

7. A spliced web of linerless label material, comprising: two longitudinally extending webs of linerless label material terminating at terminal ends, each web having a printable top side and an adhesive-coated underside, a strip of tape having a first side and an adhesive-coated second side, and the first side of the strip being adhered to the adhesive at the undersides of the webs across the terminal ends of the web to splice the webs together.

8. A spliced web as defined in claim 7, wherein both the adhesive on the undersides of the webs and the adhesive on the second side of the tape are either permanent or removable.

9. A spliced web as defined in claim 8, wherein the first side of the tape is coated with a permanent adhesive.

10. A spliced web as defined in claim 8, wherein the first side of the tape is adhesive coated.

11. A spliced web as defined in claim 7, wherein the tape is frangible.

* * * * *